United States Patent Office 3,436,033
Patented Apr. 1, 1969

3,436,033
LINE SPREADING DEVICE IN FISHING REELS
Åke Eugen Murvall, Marieberg, Svangsta, Sweden, assignor to Abu Aktiebolag, Svangsta, Sweden, a corporation of Sweden
Filed Feb. 21, 1967, Ser. No. 617,698
Claims priority, application Sweden, Feb. 22, 1966, 2,271/66
Int. Cl. A01k 89/00; F16h 21/18
U.S. Cl. 242—84.21                      5 Claims

ABSTRACT OF THE DISCLOSURE

In a fishing reel having a non-rotatable line spool, on which the line is wound by means of a rotatable line guide member, the axial reciprocating movement of the spool for spreading the line windings on the core of the spool is combined with a periodically increasing and decreasing of the amplitude of this movement by connecting the spool with one point of a lever, of which two other points are connected each with one of two excenters driven at different speeds by a common crank shaft.

---

The invention refers to fishing reels, especially those of the type having a non-rotatable line spool on which the line is wound by means of a rotatable line guide member. In known reels of this type the line windings are spread on the spool by reciprocating axial displacement of the line spool, this displacement being derived from the rotation of the crank shaft driving the line guide member. To this purpose the spool is connected with an excenter on the crank shaft, which is mounted at right angles to the axis of the spool. The axial reciprocating movement of the spool being a sinus function of the rotation of the crank shaft, the axial movement of the spool is slower towards the ends of its strokes. The line windings are hereby more spaced apart in the middle of the spool than near its flanges. It has been suggested to prevent an accumulation of windings against the flanges of the spool by making the axial reciprocating strokes of the spool smaller than the axial space between the spool flanges. The windings near the spool flanges thereby have no axial support on the flanges and become looser, new windings cutting easily down into this loose line mass.

It is an object of the invention to provide a reciprocating movement of the line spool resulting in a uniform spreading of the line windings along the entire length of the spool. Spreading means are known in other connections, e.g. from sewing machines, in which a uniform spreading of the thread along the spool is obtained by means of a thread guide driven by a heart shaped cam giving the thread guide a linear motion along the entire length of its stroke. Such mechanisms are too intricate and subjected to too rapid wearing due to the necessity of strong spring means keeping the cam follower in engagement with the cam at the rapid changes of the direction of the motion of the thread guide to be capable of practical use in a fishing reel. It is therefore an object of the invention to provide a simpler and more securely functioning mechanism for the equal distribution of the line windings over the length of the line spool in a fishing reel.

The invention is based on the new principle of periodically increasing and decreasing the axial stroke of the reciprocating movement of the spool, thereby spreading the line windings periodically over alternatedly larger and less portions of the spool. This produces a higher filling degree of the spool near its middle and thereby compensates for the higher filling degree at the ends of the axial strokes of the spool in reels with a single excenter producing said strokes of the spool.

The means by which it is proposed to attain this object according to the invention consists of a second excenter drivingly connected with the crank shaft with a speed ratio different from that of the first excenter, both excenters being connected each with a different point of a lever, a third point of which is connected with the reciprocable line spool.

Embodiments of the invention are described below and illustrated in the accompanying drawings.

Figure 1:
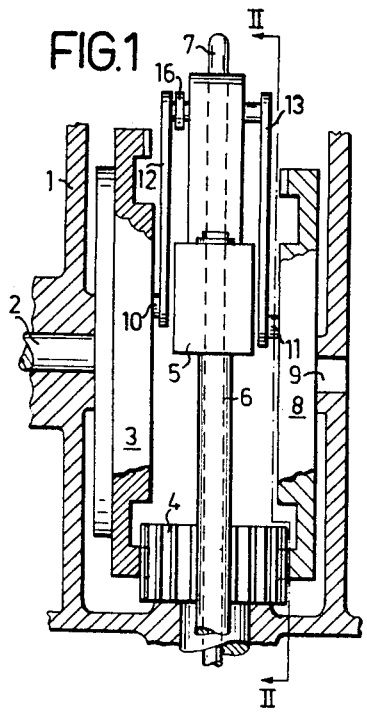
FIG. 1 shows a sectional lateral view of the mechanism of a fishing reel and FIG. 2 a side elevation seen from line II—II in FIG. 1 of said mechanism in a fishing reel of the type in which the line guide member is driven from the crank shaft through an angular gear transmission.
Figure 2:
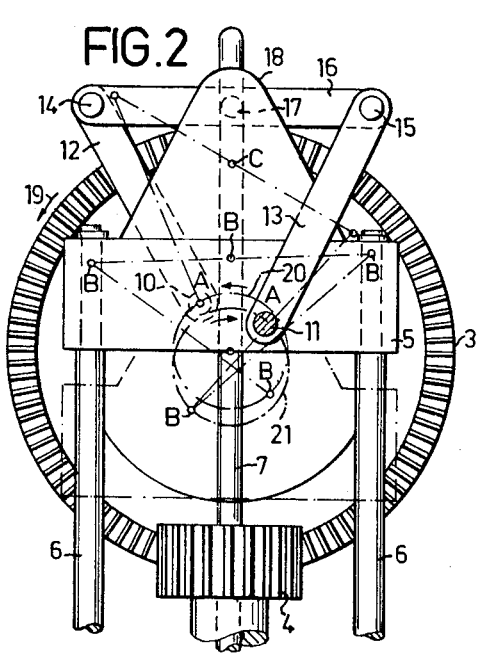

In FIGS. 1 and 2 the following parts belong to known arts, i.e. a mechanism housing 1, a crank shaft 2 journalled in said housing, a driving gear wheel 3 mounted on said crank shaft 2 and meshing with a pinion 4 connected in any known manner to the rotatable line guide member, a yoke member 5 mounted on two transmission bars 6 transmitting the motions of the yoke member 5 to the line spool (not shown), and an actuating shaft 7 axially displaceable through the gear 4 and the yoke member and adapted to be operated by an operating handle, not illustrated, for switching the line guide member on and off in a manner known per se.

According to the invention the mechanism for the transformation of the rotational motion of the driving gear wheel 3 into a reciprocating motion of the yoke member 5 comprises a second gear wheel 8 placed in a plane mainly parallel with that of the driving gear wheel 3 and journalled in the housing at 9, said second gear wheel 8 meshing with the pinion 4. This second gear wheel has a diameter and correspondingly a number of teeth which is slightly less than that of the driving gear wheel 3. When operating the crank shaft 2 the second gear wheel 8 will thus execute a number of revolutions which is higher than that of the driving gear wheel 3. Preferably, the number of teeth on the driving gear wheel 3 and on the gear wheel 8 are such, that they have no common divider. On the side of the driving gear wheel 3 facing the yoke member 5 there is an excenter pin 10, a corresponding excenter pin 11 being provided on the side of the second gear wheel 8 facing said yoke member 5. On each of said excenter pins 10 and 11 is rotatably mounted one end of a link 12 and 13, respectively, the opposite ends of which are pivotally mounted at 14 and 15 on the ends of a lever 16 which is journalled at 17 near the center of the lever on a projection 18 of the yoke member 5.

This mechanism operates as follows. Upon rotation of the crank shaft the driving gear wheel 3 rotates the pinion 4 and through this the second gear wheel 8. The different numbers of teeth on both gear wheels 3 and 8 results in a progressive change of the angular position of both gear wheels relative to each other, so that these wheels 3 and 8 return to a similar angular position first after a certain number of revolutions, forming an operation period. Since the numbers of teeth on both wheels have no common divider, the two gear wheels do not return to exact the same relative angular position after an operation period. Thereby a more even wear of the teeth of both gear wheels is obtained. While the gear wheel 3 rotates in the direction indicated by arrow 19 in FIG. 2, the excenter pin 10 moves along a circular path 20 (FIG. 2) in the direction shown by an arrow. The excenter pin 11 simultaneously rotates along the circular path 21 in the opposite direction as indicated by an arrow. Each time the excenter pin 10 reaches the position marked A, the excenter pin 11 will reach a new position farther forwards on the path 21. Thus, while pins 10 and 11 starting from their respective positions A during the first revolution move simultaneously down to the position B the lever 16 will move to the position marked B–B–B. Thereby the yoke member 5 will be moved simultaneously to the lower position marked in mixed lines in FIG. 2. During this first revolution the lever 16 will move essentially parallel with itself. At each revolution of the driving gear wheel 3 and its excenter pin 10 the excenter pin 11 will run farther forwards and the relative angular position of the pins 10 and 11 will thereby change successively. When after about half an operation period the pin 11 reaches the position B on path 21 while pin 10 reaches the position A on path 20, the both pins 10 and 11 and thereby the ends 14 and 15 of lever 16 move in essentially opposite directions up and down, the lever 16 effecting essentially only a swinging motion about its connection 17 with the yoke member 5 in the position marked C in FIG. 2. The displacement of the yoke member 5 is then essentially nil. From this minimum of motion of the yoke member the pins 10 and 11 will progressively, after a number of further revolutions, return to their initial relative angular position, in which the displacement of the yoke member is at a maximum.

The radii of circular motion of the pins 10 and 11, the length of the links 12 and 13, the length of the arms of lever 16 and the difference of diameters of the gear wheels 3 and 8 can be chosen to obtain any desired periodicity and amplitude of variation of the axial reciprocating motion of the yoke member 5 and thereby of the spool for spreading the line thereon. These variations can be made within very wide limits.

Figure 3:
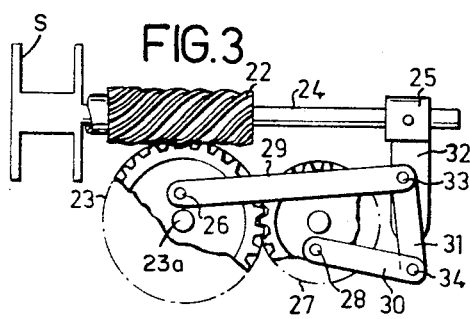
FIGS. 3 and 4 are side views of two embodiments of the driving mechanism of fishing reels of the kind in which the line guide member is driven from the crank shaft through a worm gear transmission.
Figure 4:
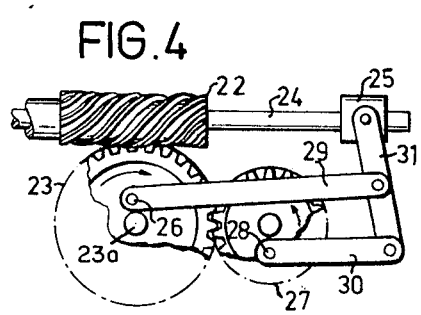

FIGS. 3 and 4 illustrate diagrammatically the application of the invention to fishing reels of the so-called open type, in which the line guide member is rotated by means of a worm 22 driven by a worm wheel 23, mounted on a crank shaft 23a. The spreading of the line windings on the spool S has in known reels of this type been obtained thereby, that a shaft 24 which is longitudinally slidable through the worm 22 and which is connected with the axially reciprocatable spool S has a transverse pin on a block 25 fixedly mounted on said shaft 24, said pin being connected by a link with an excenter pin 26 on the worm wheel 23. To obtain the more even spreading of the line forming the object of this invention a second gear wheel 27 of less diameter than the worm wheel 23 meshes with the latter so that the number of revolutions of the second gear wheel 27 is different from that of the worm wheel 23. On the second gear wheel 27 there is an excenter pin 28 and both excenter pins 26 and 28 are connected by links 29 and 30 each with one of two different points 33 and 34 of a lever journalled at a third point on the block 25 or a corresponding part fixedly mounted on the shaft 24.

In the embodiment illustrated in FIG. 3 the lever 31 is journalled on a projection 32 on the block in a point intermediate the points of connection with the two links 29 and 30. In the embodiment illustrated in FIG. 4 the lever 31 is journalled on the block 25 in a point of the lever outside the points of connection with the links. By such a variation of the active arms of the lever 31, by different speed ratios of the wheels 23 and 27, by appropriate choice of the excentricity of pins 26 and 28, by different location of the connecting points between the lever and the links and by variation of the point of the lever by which this is journalled on the block 25 or member connected with the shaft 24 the characteristics of the spreading of the line on the spool can be varied within very wide limits. Even other variations are possible within the scope of the appending claims. Thus, e.g. the two wheels 23 and 27 of the embodiments according to FIGS. 3 and 4 can both be in driving engagement with the worm 22 and receive different rotational speeds by different diameters. If in the embodiment shown in FIG. 4 the two wheels 23 and 27 are placed on either side of the worm and in engagement therewith and if the links 29 and 30 are connected with two arms of a lever 31 extending on both sides of the shaft 24, an arrangement and function similar to that of the embodiment shown in FIGS. 1 and 2 will be obtained.

What I claim is:

1. In a line spreading device for fishing reels comprising a drive mechanism with a crank shaft, an excenter driven by said crank shaft, a line spool axially displaceable for spreading the line thereon during winding and a member axially displaceable with said spool and reciprocated by said excenter; a second excenter, a driving connection between said second excenter and the crank shaft with a speed ratio different from that between the crank shaft and the first excenter, a connecting member between each of said excenters and a different point of a lever journalled on said member axially displaceable with said spool.

2. In a line spreading device for fishing reels comprising a drive mechanism with a crank shaft, a driving gear wheel mounted on said crank shaft and meshing with a pinion rotating a line guide member winding the line on a non-rotatable spool, an excenter pin on said driving gear connected with a reciprocatable member connected with the line spool for axial reciprocation thereof, a second gear wheel meshing with said pinion and having a number of teeth different from that of the first driving gear wheel, an excenter pin on said second gear wheel, links journalled with one end on each of said excenter pins and having their other ends journalled each in a different point of a lever having a third point pivotally connected with said reciprocatable member.

3. In a line spreading device for fishing reels comprising a drive mechanism with a crank shaft, a driving worm gear wheel mounted on said crank shaft and meshing with a worm gear screw, an excenter pin on said worm gear wheel, a line guide member driven by said worm gear screw, an axially reciprocatable shaft connected with an axially reciprocatable line spool and reciprocated by said excenter pin by means of a link; a second gear wheel meshing with said worm gear wheel and having a number of teeth different from that of the worm gear wheel, an excenter pin on said second gear wheel, each of said excenter pins connected by a link with one of two different points on a lever, a third point of which is journalled on a transverse axle on said reciprocatable shaft.

4. In a device as claimed in claim 3 a two-armed lever connected at its ends by links with said excenter pins and at its central part journalled on a block fixedly mounted on said reciprocatable shaft.

5. In a device as claimed in claim 3 a one-armed lever having one end journalled on a block fixedly mounted on said reciprocatable shaft and two different points of its arm connected each by a link with one of the excenter pins.

References Cited

UNITED STATES PATENTS

| | | | |
|---|---|---|---|
| 2,711,292 | 6/1955 | Taggart et al. | |
| 3,084,885 | 4/1963 | Hornbostel | 242—84.21 |
| 3,094,296 | 6/1963 | Nurmse. | |
| 3,347,478 | 10/1967 | Sternberg | 242—26.3 |

BILLY S. TAYLOR, *Primary Examiner.*

U.S. Cl. X.R.

74—47